US012519845B1

(12) United States Patent
Cai

(10) Patent No.: US 12,519,845 B1
(45) Date of Patent: Jan. 6, 2026

(54) PRIVATE SPEAKER NOTES INTERFACE IN VIRTUAL CONFERENCES

(71) Applicant: Zoom Communications, Inc., San Jose, CA (US)

(72) Inventor: Xiaolong Cai, San Jose, CA (US)

(73) Assignee: Zoom Communications, Inc., San Jose, CA (US)

(*) Notice: Subject to any disclaimer, the term of this patent is extended or adjusted under 35 U.S.C. 154(b) by 264 days.

(21) Appl. No.: 18/349,610

(22) Filed: Jul. 10, 2023

(51) Int. Cl.
*H04L 65/403* (2022.01)
*G06F 3/0481* (2022.01)
*G06F 3/04847* (2022.01)
*G06F 40/169* (2020.01)
*G10L 15/26* (2006.01)

(52) U.S. Cl.
CPC .......... *H04L 65/403* (2013.01); *G06F 3/0481* (2013.01); *G10L 15/26* (2013.01); *G06F 3/04847* (2013.01); *G06F 40/169* (2020.01); *G06F 2203/04804* (2013.01)

(58) Field of Classification Search
CPC . H04L 65/403; G06F 3/0481; G06F 3/04847; G06F 40/169; G06F 2203/04804; G10L 15/26
See application file for complete search history.

(56) References Cited

U.S. PATENT DOCUMENTS

| | | | |
|---|---|---|---|
| 5,870,454 A | 2/1999 | Dahlen | |
| 6,266,683 B1 | 7/2001 | Yehuda et al. | |
| 6,490,547 B1 | 12/2002 | Atkin et al. | |
| 9,875,224 B1 * | 1/2018 | VanBlon | G06F 40/103 |
| 10,708,337 B1 | 7/2020 | Young | |
| 2003/0040899 A1 | 2/2003 | Ogilvie | |
| 2004/0102957 A1 | 5/2004 | Levin | |
| 2004/0236830 A1 | 11/2004 | Nelson et al. | |
| 2009/0204585 A1 | 8/2009 | Shigeeda | |
| 2009/0222741 A1 | 9/2009 | Shaw et al. | |

(Continued)

FOREIGN PATENT DOCUMENTS

CN 1809868 A 7/2006

OTHER PUBLICATIONS

YouTube, How to See Your Speaker Notes Whilst Presenting Google Slides, Beard Squared, https://www.youtube.com/watch?v=kDt45HKHsxA, Sep. 10, 2022, 2 pages.

(Continued)

Primary Examiner — Angie Badawi
(74) Attorney, Agent, or Firm — Young Basile Hanlon & MacFarlane, P.C.

(57) ABSTRACT

Content displayed at a device of a conference participant to a conference is shared via a conferencing application. At least a portion of a script associated with the conference is displayed in a private user interface of the conferencing application. The private user interface is exclusively displayed at the device of the conference participant. In response to receiving a bookmark command, a location within the script is stored based on the bookmark command and an indication of a portion of the content is also stored. In response to receiving a restore command, a portion of the script that includes the location is displayed in the private user interface, and the portion of the content is shared to the conference.

20 Claims, 12 Drawing Sheets

(56) References Cited

U.S. PATENT DOCUMENTS

| | | |
|---|---|---|
| 2009/0263777 A1* | 10/2009 | Kohn .................. G09B 7/00 434/350 |
| 2010/0169790 A1 | 7/2010 | Vaughan et al. |
| 2010/0169951 A1 | 7/2010 | Vaughan et al. |
| 2010/0318916 A1 | 12/2010 | Wilkins |
| 2012/0245936 A1 | 9/2012 | Treglia |
| 2013/0024196 A1 | 1/2013 | Ganong, III et al. |
| 2013/0080440 A1 | 3/2013 | Wyle et al. |
| 2014/0019438 A1 | 1/2014 | Le Chevalier et al. |
| 2014/0059468 A1 | 2/2014 | Allgair |
| 2014/0282013 A1 | 9/2014 | Amijee |
| 2014/0372877 A1 | 12/2014 | Snyder et al. |
| 2015/0199308 A1 | 7/2015 | Cooper et al. |
| 2019/0108492 A1 | 4/2019 | Nelson et al. |
| 2019/0273767 A1 | 9/2019 | Nelson et al. |
| 2021/0248556 A1 | 8/2021 | Venkatraman et al. |
| 2022/0374590 A1 | 11/2022 | Seth et al. |

OTHER PUBLICATIONS

YouTube, Zoom—View Speaker Notes When Presenting PowerPoint | Presenter View, Chris Menard, https://www.youtube.com/watch?v=1Jc4-iEyK7A, May 31, 2022, 4 pages.

Microsoft 365 Support, PowerPoint 2013 Training, Use Presenter View, https://support.microsoft.com/en-us/office/video-use-presenter-view-798dcb21-603c-43c3-a782-9a2d7720ab33#ID0EBBD=Overview, Jul. 2023, 4 pages.

YouTube, Use Reading View to display PowerPoint slides in a window (great for 1 screen in Teams & Zoom), thinkoutsidetheslide.com, https://www.youtube.com/watch?v=NFQ9EMIP3jl, Sep. 15, 2021, 2 pages.

Microsoft 365 Support, Start the Presentation and See Your Notes in Presenter View, https://support.microsoft.com/en-us/office/start-the-presentation-and-see-your-notes-in-presenter-view-4de90e28-487e-435c-9401-eb49a3801257, Jul. 2023, 9 pages.

\* cited by examiner

PRIVATE SPEAKER NOTES INTERFACE IN VIRTUAL CONFERENCES

FIELD

This disclosure generally relates to conference management and, more specifically, to creating and using scripts using a private user interface associated with a conferencing software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
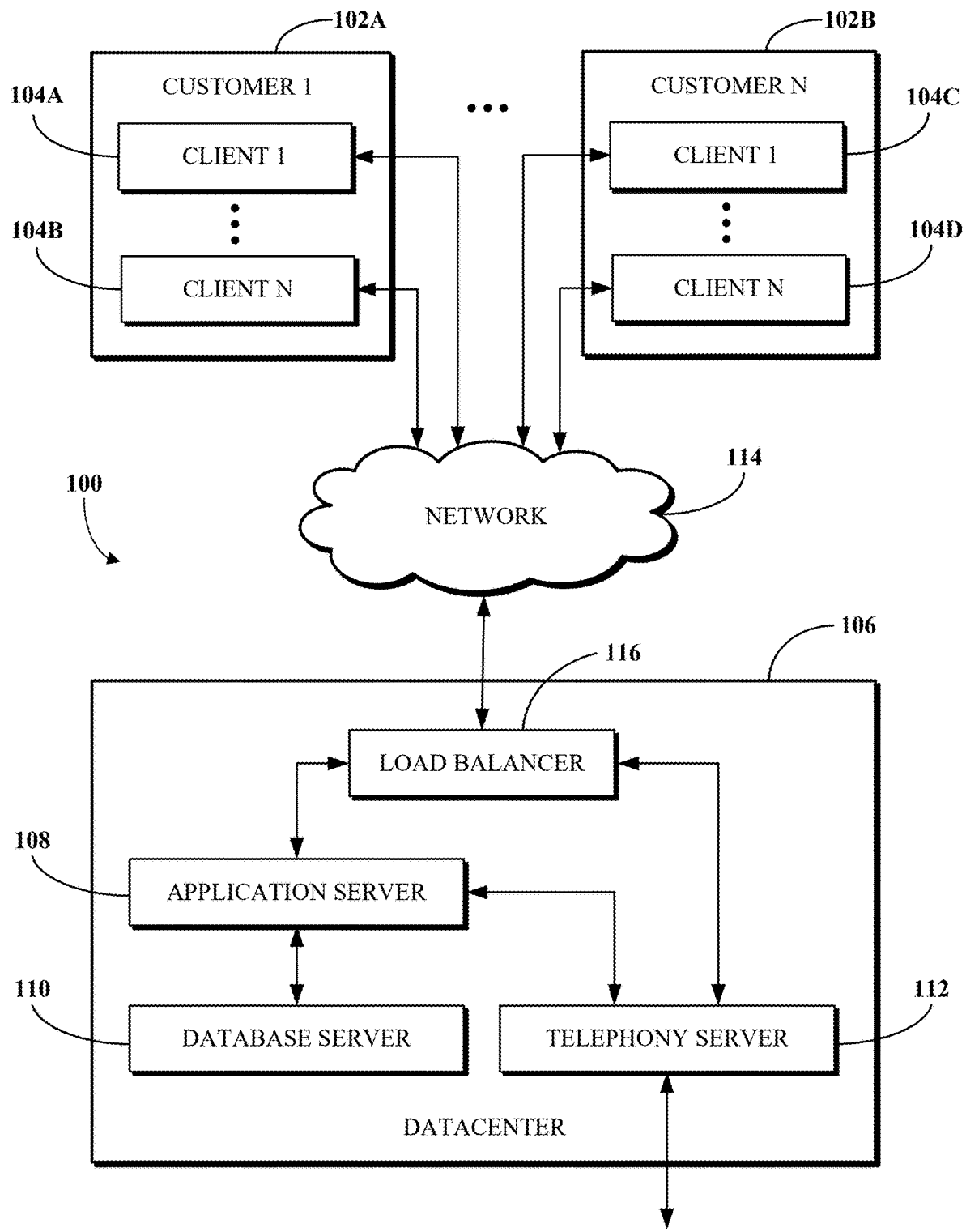
FIG. 1 is a block diagram of an example of an electronic computing and communications system.

Conferencing software is frequently used across various industries to support video-enabled conferences between participants in multiple locations. Conference participants may separately connect to the conferencing software from their own remote locations. Conferencing software may be available as a standalone software product or it may be integrated within a software platform, such as a unified communications as a service (UCaaS) platform.

A conference participant may be a presenter of content at a conference. The content may be a slide presentation, a document, a whiteboard, and/or one of more windows associated with applications executing and displaying content at a device of the presenter. The presenter may prepare a script (e.g., a talk track) to use (e.g., read) while presenting.

To illustrate, the content may be a slideshow presentation prepared using a presentation application. Traditionally, the presenter may use features of the presentation application to prepare and use the script. The presentation application may enable the presenter to associate speaker notes with slides. At presentation time (i.e., when the conference takes place), the presenter may utilize two separate displays (e.g., screens) to present the content and read the speaker notes. One display would showcase the slides to the conference participants; and the other display can be used for displaying the associated speaker notes.

However, using dual displays results in inconveniences and a potential disconnect with the audience (i.e., the other conference participants). For example, the need for additional equipment and the complexity of managing two displays concurrently can disrupt the presenter's flow and introduce technical difficulties. Furthermore, relying on a screen for the speaker's personal reference may hinder eye contact and engagement with attendees as they may undesirably focus on that screen, compromising effective communication. Furthermore, associating speaker notes at the slide level may not provide sufficient granularity for the presenter. In many cases, presenters may desire to link specific notes (e.g., portions of the script) to individual objects (e.g., sentences, graphs, or list items) within slides.

In another illustration, the content may be associated with an application that does not include capabilities that enable the presenter to prepare speaker notes. The presenter may rely on a document editing application to prepare their notes as one monolithic script without specific linkages between portions of the content and portions of the script. At presentation time, the presenter may display the script in the document editing application, which is separate from the conferencing software.

This set up presents several challenges and thus technical shortcomings, as well, including a lack of synchronization (e.g., difficulty in aligning the content with the script due to the absence of specific linkages), an increased cognitive load and a reduced focus (e.g., the presenter continuously shifts their attention between the content and the document editing application), transition difficulties (e.g., as they transition between portions of the content, the presenter may have difficulties finding their place in the script), reduced audience engagement, and potential technical difficulties (e.g., the document editing application may crash or may become obscured by the conferencing application), to name a few.

Implementations of this disclosure address problems such as these by providing a private user interface that is integrated with a conferencing application and enables a presenter (e.g., user) to effectively create and deliver their script. That the user interface is "private" means that the user interface is exclusively displayed at the user device (and thus exclusively for the user of that user device) and is not shown to any of the other participants of the conference. That is, the private user interface is not displayed (or delivered for display) at any other devices connected to the conference.

At creation time, the user can associate specific notes with objects of the content to be presented. At presentation time, the conferencing software facilitates the delivery of the script via the private user interface. Such more detailed level of association between portions of the content and portions of the script allows for precise referencing and provides a comprehensive framework for the presenter's delivery. By enabling the association of notes with specific objects, presenters can enhance their ability to deliver content effectively and ensure a more engaging and tailored conference experience for the audience.

To describe some implementations in greater detail, reference is first made to examples of hardware and software structures used to implement a system for creating (e.g., authoring) and using a script in a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
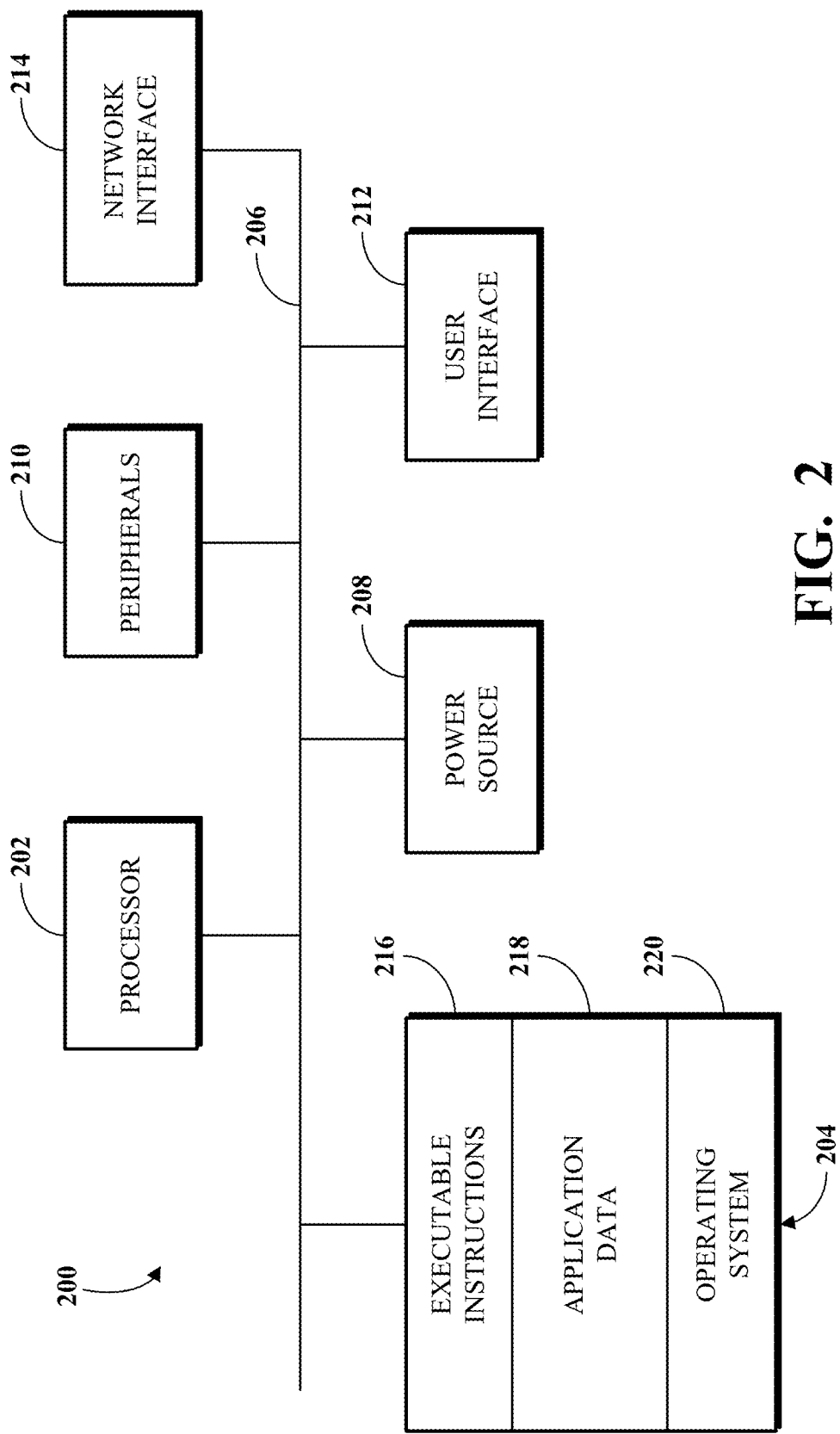
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
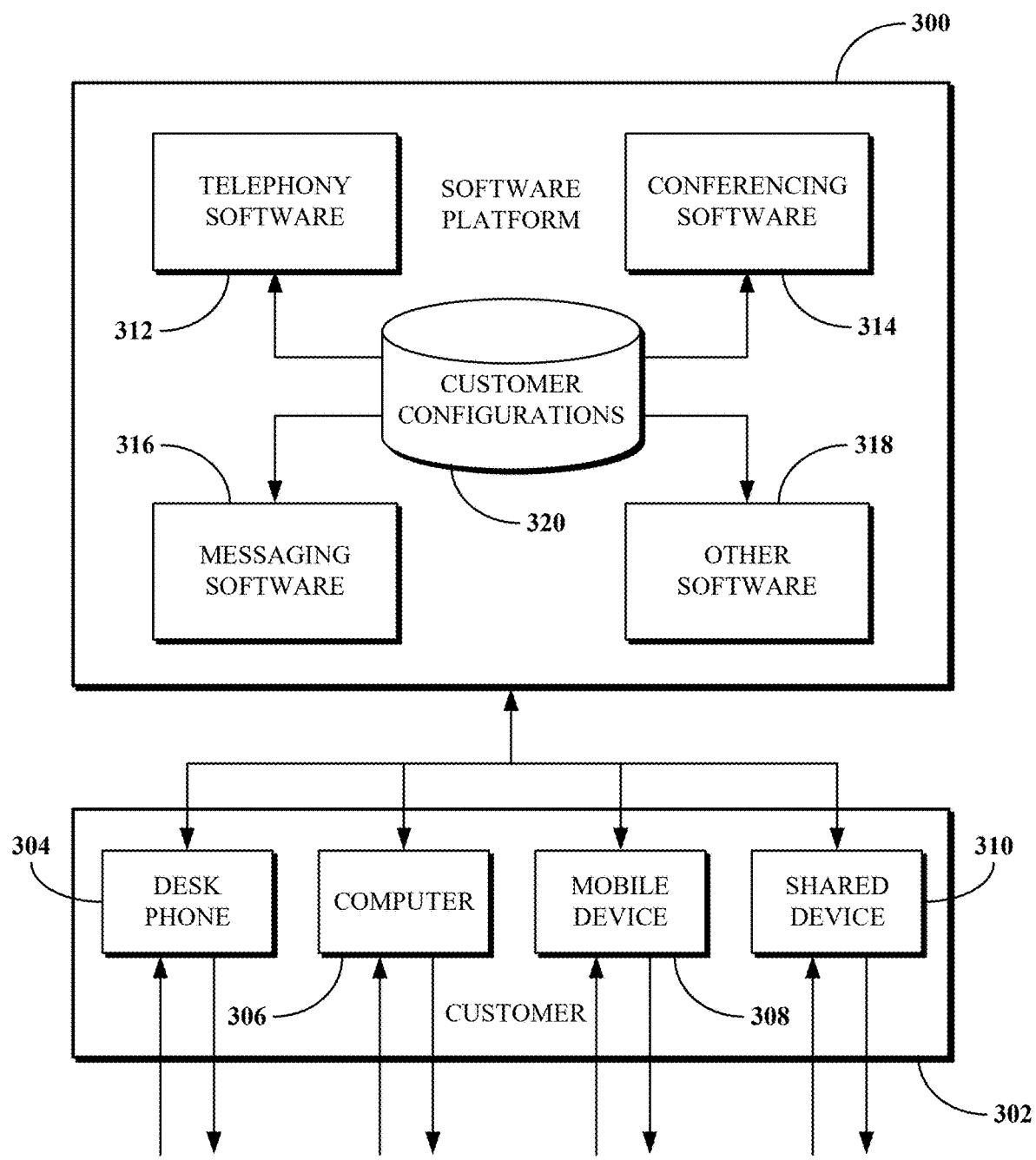
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include script management software usable for creating and using a script. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
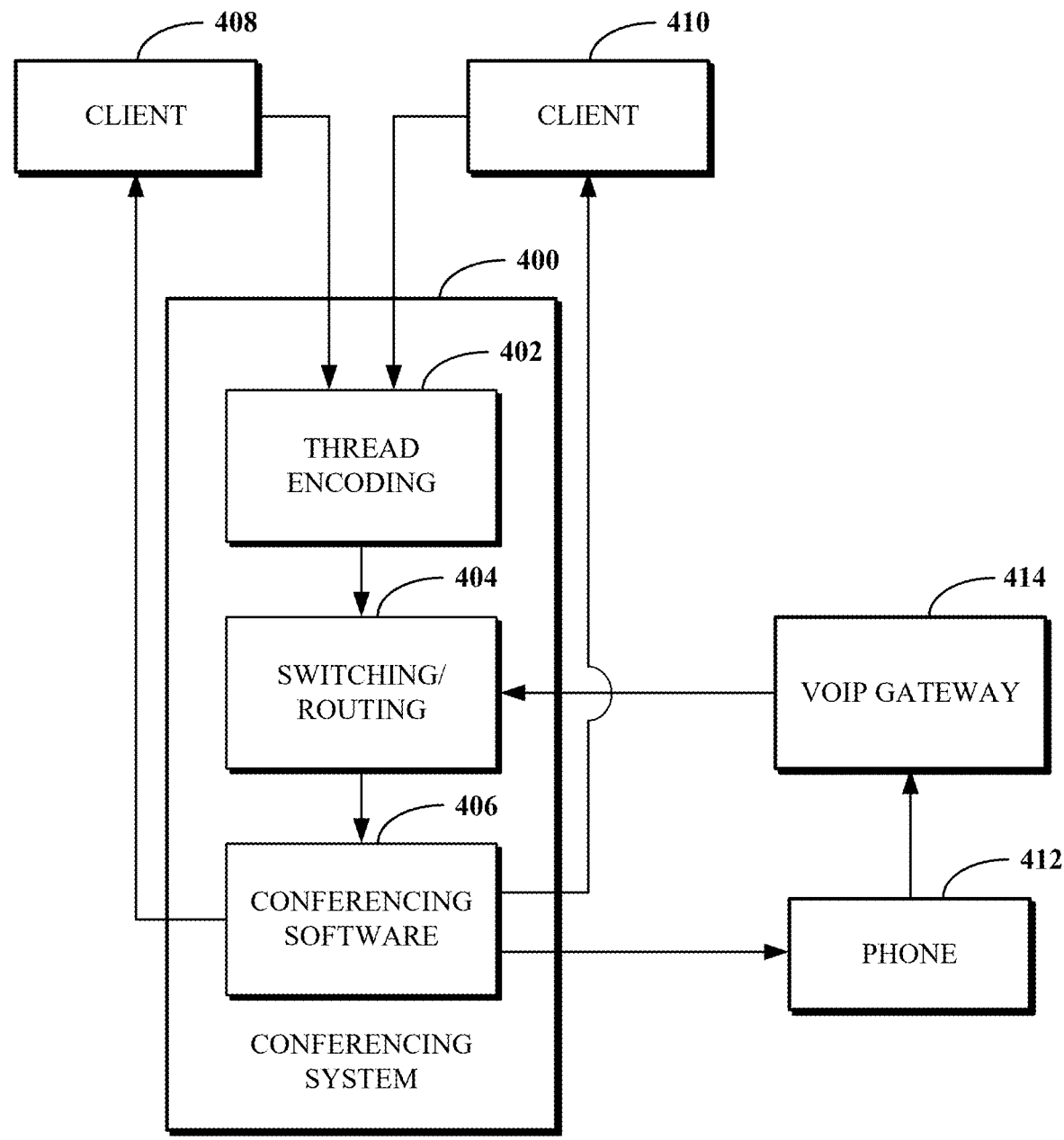
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may be, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time.

The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
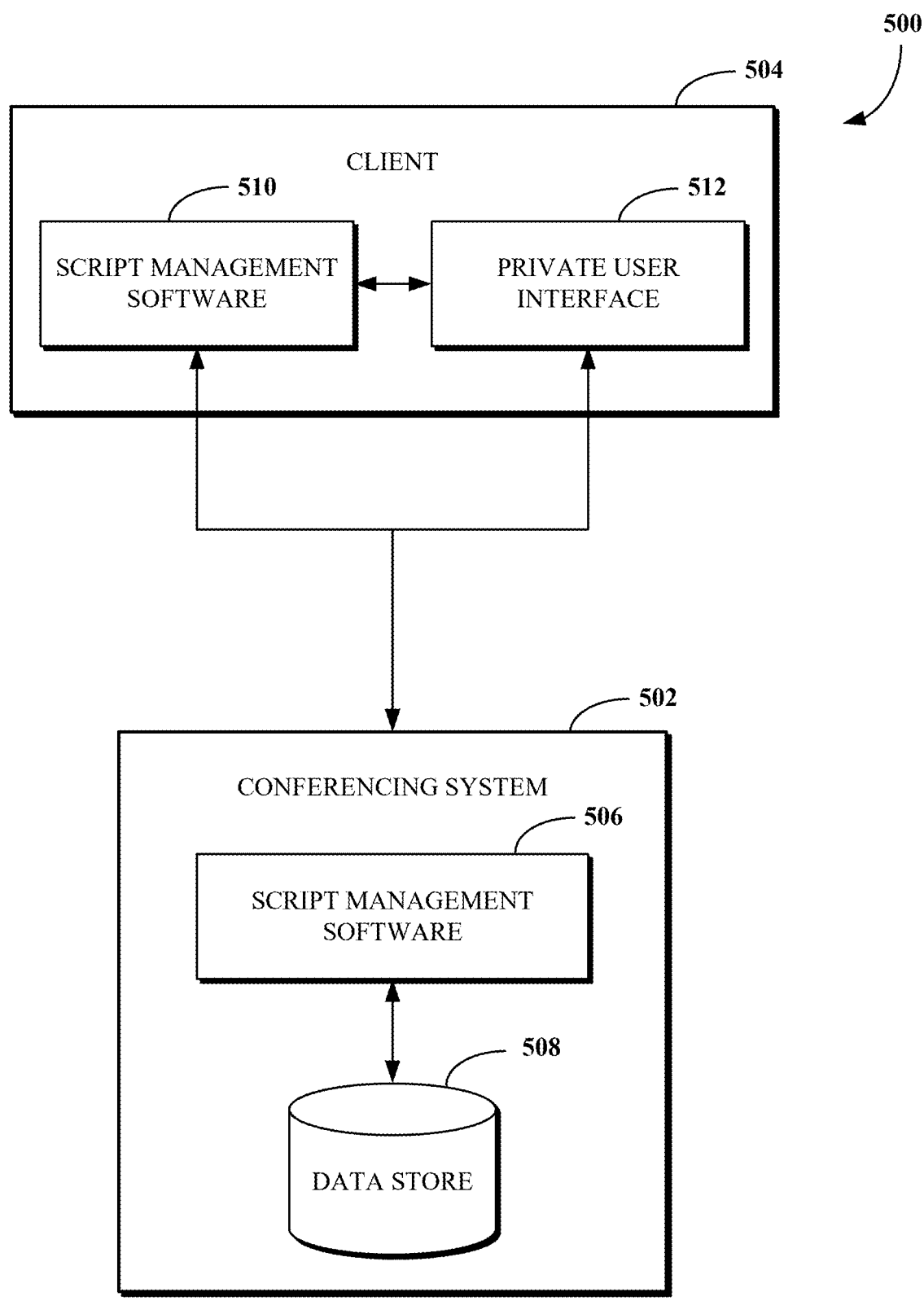
FIG. 5 is a block diagram of a system for conference script management.

FIG. 5 is a block diagram of a system 500 for conference script management. The system 500 includes a conferencing system 502, which can, for example, be the conferencing system 400 of FIG. 4, and a client 504, which can, for example, be one of the client 408 or the client 410 of FIG. 4. The conferencing system 502 includes a script management software 506, which can be, can be included in, or can work in conjunction with the conferencing software 406 of FIG. 4. The conferencing system 502 also includes a data store 508. The client 504 includes a script management software 510, which causes a private user interface 512 to be displayed at the client 504.

The script management software 506 enables a user of the client 504 to create a script for content to be presented in a conference hosted by the conferencing system 502 and facilitates the use of the script while the user is presenting the content during the conference. The script management software 506 associates, in the data store 508, the script with a scheduled conference and/or with content to be presented at the scheduled conference. As further described below, a script can be a set of notes.

The script management software 510 enables a user to create (e.g., author, edit, and/or modify) and use scripts. The script management software 510 may cause the private user interface 512 to be displayed at the client 504. In an example, the script management software 510 may be an application that is installed at the client 504. In another example, the client 504 may be or include a client engine (e.g., a set of instructions, such as JavaScript instructions) that may be transmitted by the script management software 506 to the client 504 and that may operate within a host application, such as a web browser, executing at the client 504. The client engine can manage user interactions and facilitate communications with the script management software 506. As such, the script management software 510 may, inter alia, cause user interfaces of the private user interface 512 to be rendered at client 504.

The private user interface 512 may be or include several user interfaces that implement one or more user flows that enable the user to create a script or to use a script. The private user interface 512 may directly communicate with the system 502 or may communicate with the system 502 via the script management software 510.

The data store 508 can store data related to conferences and data related to users who have participated or may participate in one or more conferences. The data store 508 can be included in or implemented by a database server, such as the database server 110 of FIG. 1. The data store 508 can include data related to scheduled or ongoing conferences and data related to users of the script management software 506 and/or a conferencing software associated therewith. The data store 508 can include associations between users and scripts, between content documents and scripts, and/or between conferences and scripts.

Figure 6A:
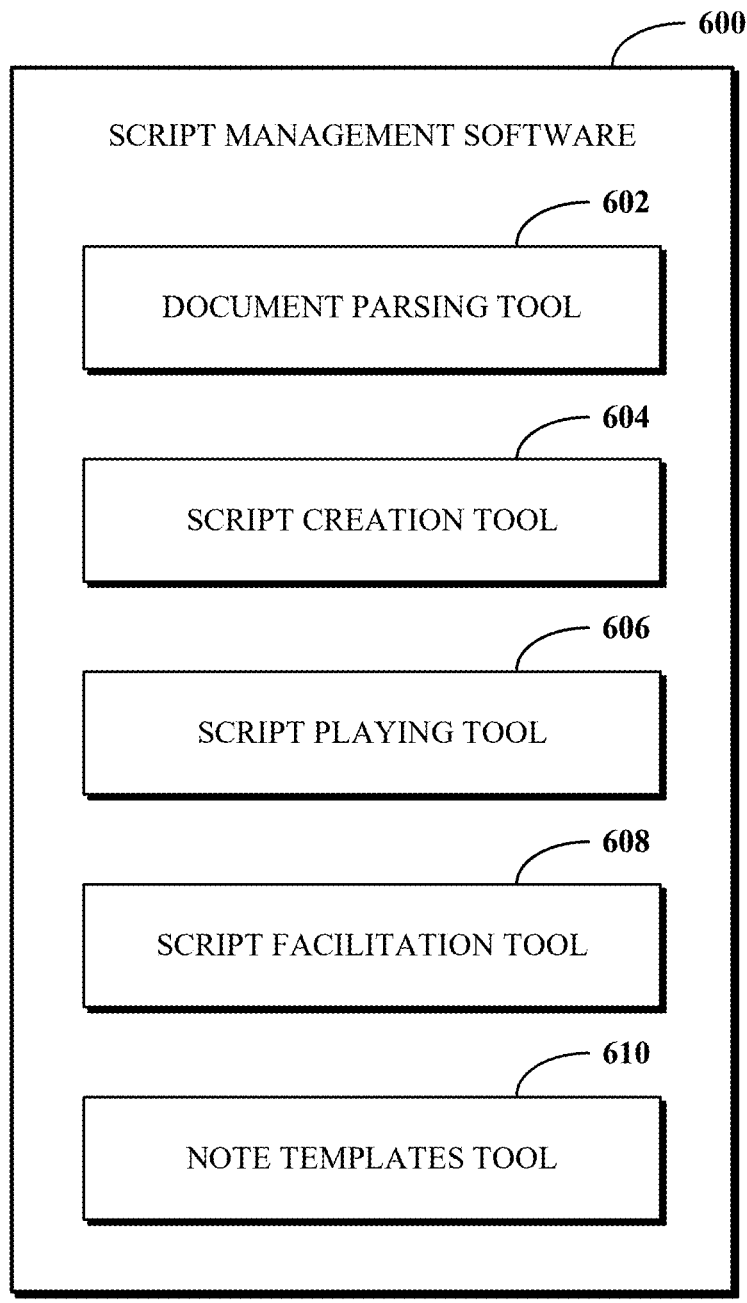
FIG. 6A is a block diagram of example functionality of a script management software.

FIG. 6A is a block diagram of example functionality of a script management software 600. The script management software 600 may be the script management software 506 or the script management software 510 of FIG. 5. The script management software 600 includes tools, such as programs, subprograms, functions, routines, subroutines, operations, executable instructions, and/or the like for, inter alia and as further described below, creating and using presentation scripts.

At least some of the tools of the script management software 600 can be implemented as respective software programs that may be executed by one or more computing devices, such as the computing device 200 of FIG. 2. A software program can include machine-readable instructions that may be stored in one or more memories such as one or more of the memory 204, and that, when executed by one or more processors, such as the processor 202 of FIG. 2, may cause the computing device to perform the instructions of the software program.

As shown, the script management software 600 includes a document parsing tool 602, a script creation tool 604, a script playing tool 606, a script facilitation tool 608, and a note templates tool 610. In some implementations, the script management software 600 can include more or fewer tools. In some implementations, some of the tools may be combined, some of the tools may be split into more tools, or a combination thereof. Statements herein such as "a tool/software/functionality/etc. of a user or of a script management software" should be understood to mean "a tool/software/functionality/etc. that is executing at or is available to a client of the user."

A script management software that is implemented by or is available at a client may not include some of the tools of the script management software 600. To illustrate, and without limitations, when the script management software 510 is an engine that is as described above, then the script management software 510 may not include the document parsing tool 602. In any case, if functionality of a tool of the script management software 600 is fully or partially unavailable in the script management software 510, then the script management software 510 may communicate with the script management software 506 to access the unavailable functionality.

A script can be a set of notes. A note can be a textual note, a graphical note, an audio note, and/or some other type of note. A textual note can be composed of text, for example, written words or other sets of single or multiple written characters. A textual note can be a single word, phrase, or one or more paragraphs. A graphical note includes visual elements, such as a diagram, a chart, a graph, a picture, a symbol, and/or other visual elements. An audio note can be a recorded message, a music clip, sound effects, spoken words, and/or another type of audible content. Each note can be associated with an aspect of content that the user intends to present. Via the script management software 506, the user can associate notes with aspects of the content. An aspect of the content can be the content itself (e.g., the content as a whole), an object of the content, an area of the content, or some other aspect of the content.

To illustrate, the content to be presented may be a slide presentation and the user can associate respective notes with the presentation as a whole, with the first slide of the presentation, with the third bullet item of the ninth slide, and with a pie chart object that is on the $20^{th}$ slide. As another illustration, the user may want to demonstrate a software application during the presentation. As such, the content to be presented can be the user interfaces as displayed by the application. While creating the script, the user can identify a portion of the user interface to attach a note to. The private user interface can include controls that enable the user to identify the portion of the content (e.g., the portion of the user interface) by drawing a bounding polygon or a lasso around the portion of the content. As yet another illustration, the content may be a whiteboard and the user can attach notes to objects included in the whiteboard. The content may be a word processing document and the user is able to associates notes of the script with paragraphs of the document.

The document parsing tool 602 may receive, from the user, content to be presented at a conference and identify objects (e.g., "annotatable objects") within the content that the user can attach notes to (e.g., associated notes with). The content may be authored in a native application that is separate from the document parsing tool 602. The document parsing tool 602 can parse (e.g., analyze) the content to identify the annotatable objects therein.

In an example, the document parsing tool 602 may use an Application Programming Interface (API) of the native application to identify the annotatable objects. In an example, the document parsing tool 602 may receive the content in a native (e.g., application specific) format and convert the content or to cause the content to be converted to a neutral format. The neutral format may be a structured format. The structured format may be an XML, HyperText Markup Language (HTML), or some other structure-based format. In an example, the document parsing tool 602 may receive the content in the neutral format.

The script creation tool 604 enables the user to create a script. In an example, the script creation tool 604 may enable the user to associate notes with objects (annotatable objects) of the content. In an example, the user may provide a monolithic script. A monolithic script can be a script (or one long note) that may be associated with the content as a whole.

Figure 7:
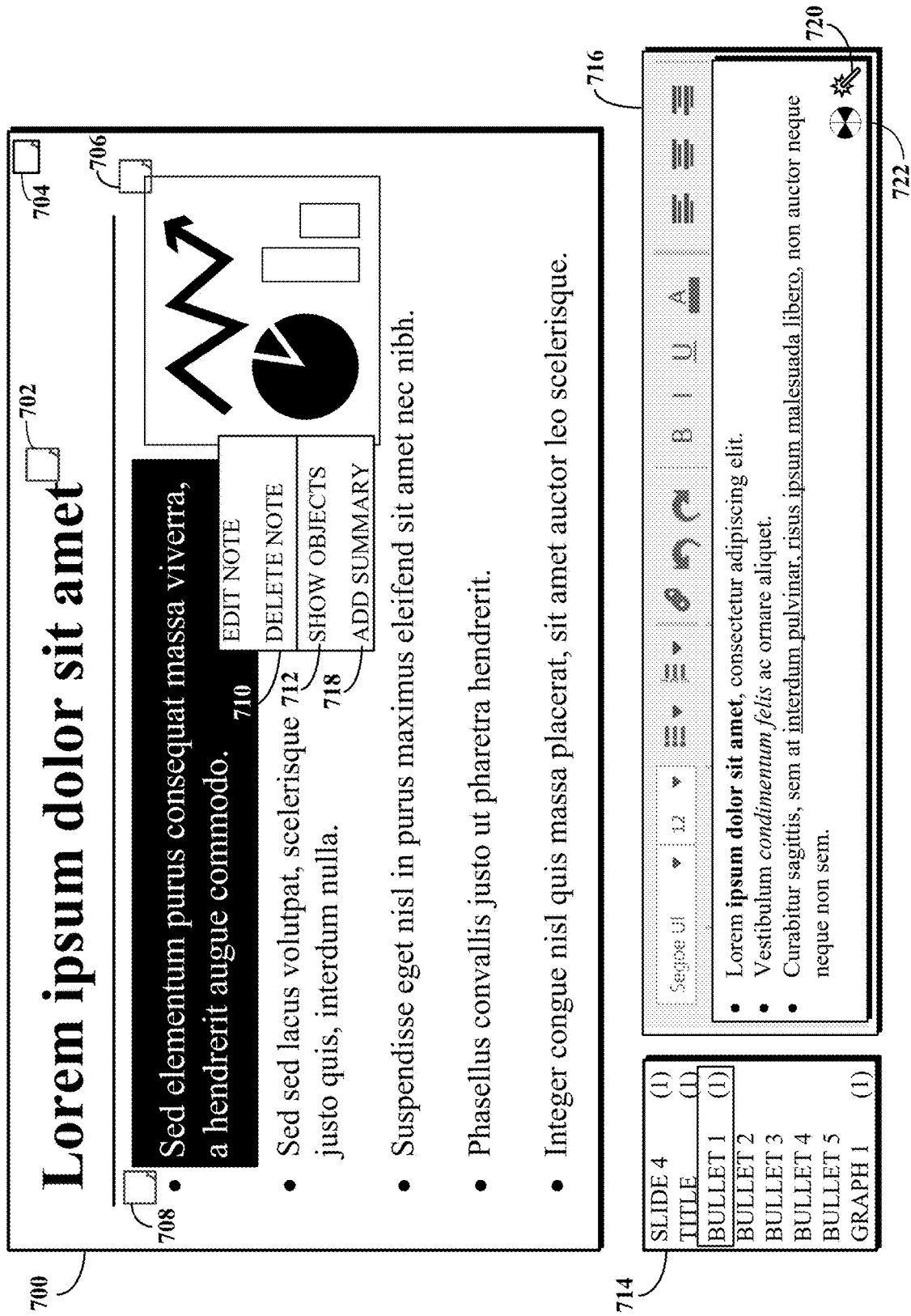
FIG. 7 illustrates examples of user interfaces that can be used for creating a script for a conference.

The operations of the document parsing tool 602 and the script creation tool 604 are further described with respect to FIG. 7. FIG. 7 illustrates examples of user interfaces that can be used for creating a script for a conference. The user interfaces can be generated by a script management software, such as the script management software 506 or the script management software 510 of FIG. 5, or script management software 600 of FIG. 6A. The user interfaces of FIG. 7 can be presented in or as the private user interface 512 of FIG. 5. While certain user interactions, interface controls, and layouts are described with respect to FIG. 7 and other user interfaces described herein, the disclosure is not so limited and other interactions, interface controls, and/or layouts are possible.

The script playing tool 606 enables the user to use the notes associated with the content while the user is presenting the content. The user can read, navigate through, bookmark, or perform other actions with respect to the script or notes, as further described herein. The script playing tool 606 can present the notes via a private user interface, such as the private user interface 512 of FIG. 5. As mentioned above, that the user interface is "private" means that the user interface is exclusively displayed at the user device of the subject user and thus is not shown to any of the other participants of the conference. That is, the private user interface is not displayed (or delivered for display) at any other devices connected to the conference. The private user interface is further described with respect to FIGS. 8A and 8B.

The script facilitation tool 608 can enable synchronization between locations in content and the notes based on the speech of the user. Via the script facilitation tool 608, the user can remain aware of what they have already covered (e.g., presented or talked about) in the content and where they are in the script.

Figure 6B:
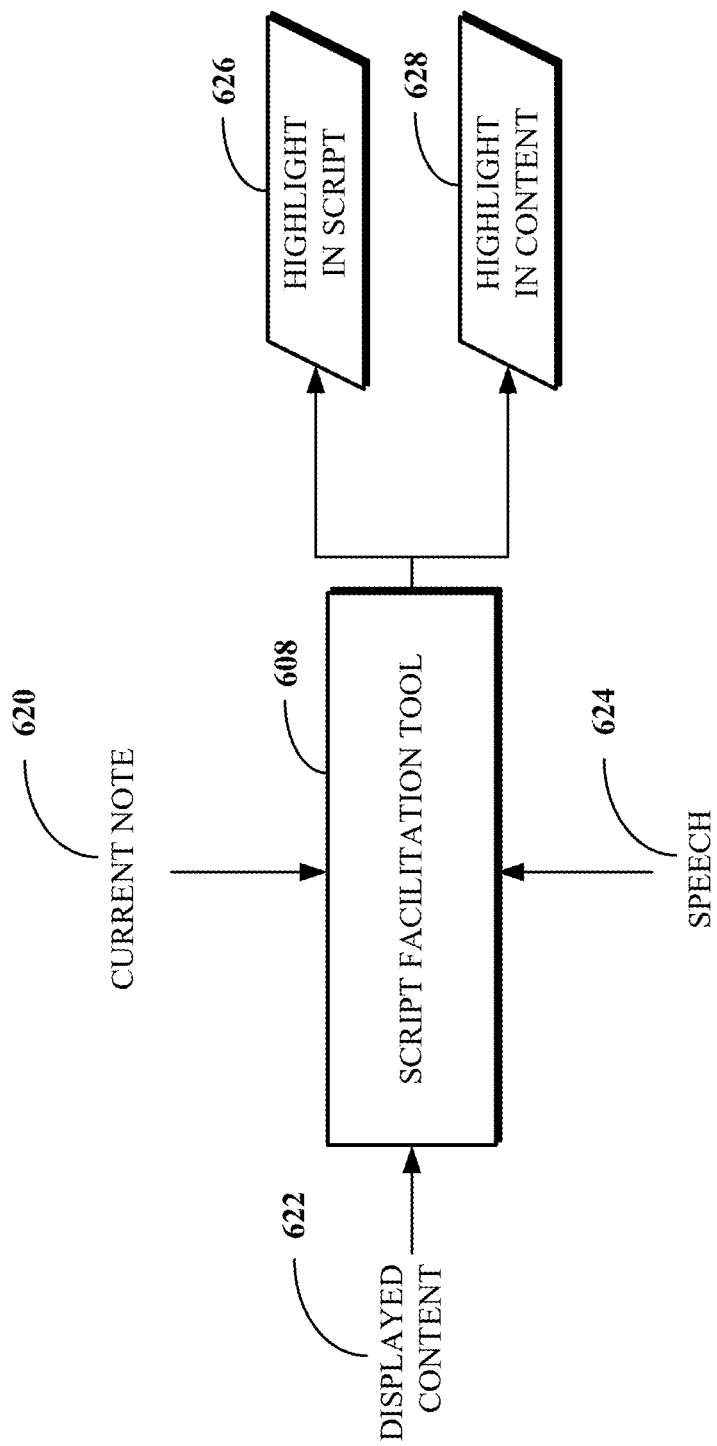
FIG. 6B illustrates functionality of a script facilitation tool.

FIG. 6B is used to illustrate functionality of the script facilitation tool 608. The script facilitation tool 608 identifies (e.g., accesses or determines) a current note 620 (or a portion of a script) displayed in the private user interface 512 and content 622 displayed (e.g., currently shared or viewable by the other conference participants). The script facilitation tool 608 also receives speech 624 as spoken by the user. The speech can be captured by an audio input device, such as a microphone, of the device of the user, such as the client 504 of FIG. 5. The script facilitation tool 608 can convert, or cause to be converted, the speech to text. Alternatively, the script facilitation tool 608 may receive the text of the speech. The script facilitation tool 608 is said to look ahead in the script and look backwards in the content.

The script facilitation tool 608 can highlight in the current note 620 a portion of the note that should be spoken (e.g., should be read) next by the user, as indicated by a block 626. For example, the script facilitation tool 608 may identify, based on the speech words of the current note 620 just spoken by the user and highlights, such as in a bold font, the next predefined number (e.g., 2 or 3) words of the current note 620 to be read. In an example, the number of words to be highlighted can be based on a reading speed of the user. The script facilitation tool 608 can estimate the average reading speed, taking into account pauses for breath or emphasis.

The user may deviate from the script as they are presenting. As such, the script facilitation tool 608 may not require exact match between the speech and the script. Rather, the script facilitation tool 608 may identify key phrases or semantic units within the spoken input, and may employ natural language processing (NLP) algorithms to discern the contextual meaning. As such, the script facilitation tool 608 can track the user speech even when the user diverges somewhat from the written script. In the case of deviations between the spoken words and the script, the script facilitation tool 608 can use a fuzzy matching technique, which may identify matches that may be less than 100% perfect. As such, synonyms, paraphrasing, changes in word order, or omission/addition of minor words can be accounted for without losing track of the position of the user within the script.

In some situations, the user may significantly deviate from the script such that no match that is greater than a threshold (e.g., 75%) match is possible. In such a case, the script facilitation tool 608 may stop highlighting next words to be spoken. The script facilitation tool 608 may receive an input from the user indicating a location within the script at which the highlighting is to resume.

The script facilitation tool 608 can mark portions of the content covered by the user, as indicated by a block 628. In response to determining that a user has completed (e.g., has read) a note associated with an annotatable object of the content, the script facilitation tool 608 may highlight the annotatable object so that the user can be aware of their progress. In an example, highlighting the annotatable object can include overlaying an icon, such as an icon 820 of FIG. 8A, to the annotatable object. In another example, some notes may be associated with annotatable objects or the script may be a monolithic script. As such, the script facilitation tool 608 can perform semantic analysis to compare the spoken words to the displayed content to identify the portion of the content that has been covered. The portion of the content can be marked as covered (e.g., presented) based on the semantic analysis.

The script facilitation tool 608 can also mark portions of the content not covered by the user. For example, in response to determining that the user is about to change the currently displayed content, the script facilitation tool 608 can identify (e.g., highlight) portions of the currently shared content that the user has not covered. The determination can be made based on a semantic comparison of the displayed content to the text identified from the speech.

The note templates tool 610 enables users to maintain respective libraries of notes. To illustrate, a user may prefer to always start and end presentations with the same talk track; or the user may be a subject matter expert and may be a frequent presenter on the subject matter and may frequently repeat the same talking points (e.g., notes). As such, the user may create template notes that the user can select, during script creation, for inclusion in their presentations. The note templates tool 610 may present user interfaces (not shown) usable to create and edit template notes and to include template notes in scripts. The note templates tool 610 can include or use a large language model (LLM), which is a type of natural language processor, for improving and expanding on notes. For example, the note templates tool 610 may include capabilities (e.g., features or functions) that a user can use to request that a portion of a template note be rewritten or expanded (e.g., elaborated) upon by the LLM.

FIG. 7 illustrates examples of user interfaces that can be used for creating a script for a conference. FIG. 7 illustrates that the user is creating a script (e.g., notes) for a slide 700 of the slide presentation. However, the disclosure herein is not limited to any particular type of content or native application used to create the content. Annotation icons 702,

704, 706, and 708 illustrate that the user has associated notes with the slide as a whole, with a title of the slide, with a chart included in the slide, and with a list (e.g., bullet) item, respectively. That is, when a user associates a note with an object of the content, the script creation tool 604 may adorn the object with a marker (e.g., an icon) indicating that the object is annotated.

The script creation tool 604 may present a context menu 710 in response to a command from the user. For example, the context menu 710 may appear when a right mouse button of a pointer device is clicked. The context menu 710 may include an action 712 (e.g., an action labeled "SHOW OBJECTS"), which causes an object list 714 to be displayed. The script creation tool 604 populates the object list 714 with the annotatable objects that the document parsing tool 602 identified in the slide 700. The object list 714 may include indicators of the annotatable objects that have notes associated therewith. To illustrate, the object list 714 indicates that one note (e.g., "(1)") is associated with the object labeled "GRAPH 1."

In response to a selection of an annotatable object by the user, the script creation tool 604 may present an editor 716 enabling the user to create or modify a note associated with the annotatable object. In an example, the editor 716 may be a simple editor that enables the user to enter plain text. In an example, and as illustrated in FIG. 7, the editor 716 can be a What-You-See-Is-What-You-Get (WYSIWYG) rich text editor that enables the user to include text, text formatting, hyperlinks, images, tables, and the like, in a note.

The user may be able to obtain an automatically generated summary of at least a subset (e.g., all) of the notes associated with the slide 700. For example, the context menu 710 may include an action 718 (labeled "ADD SUMMARY") that can be used to obtain a summary of one or more notes. A common presentation structure is the "tell me what you're going to tell me, tell me, tell me what you told me." As such, a summary of the at least some of the notes may be used at least for the "tell me what you're going to tell me" and the "tell me what you told me" parts of the presentation.

In response to the user invoking the action 718, the script creation tool 604 may assemble (e.g., concatenate) all the notes associated with the content as a whole or a portion therein (such as the slide 700) and transmit a request, such as to an LLM with a request (e.g., prompt) to summarize the notes. In an example, the request to summarize the notes can include additional parameters. For example, the request may include a word count or a sentence count. To illustrate, the request may essentially be to "summarize the following notes in no more than 40 words" or "summarize the following notes in 3 sentences." The script creation tool 604 may associate the received summary with the slide as a whole. Thus, the received summary can be the note corresponding to the annotation icon 704.

An action 720, when invoked, may cause a rewrite request to be transmitted, such as to an LLM. The rewrite request can include at least a portion of the note, which may be selected by the user. In response to the rewrite request, the script creation tool 604 may receive a rewritten portion corresponding to the portion of the note. The script creation tool 604 may present the rewritten portion to the user for editing or approval. The user may overwrite the portion with the rewritten portion. The rewritten portion may enhance the clarity and coherence of the content and can be tailored to the audience. For example, the rewritten portion can include less technical terms or concepts than the portion of the note.

An action 722, when invoked, may cause a translations request to be transmitted, such as to an LLM. The translation request can include at least a portion of the note, which may be selected by the user. The user may select a language to convert the portion of the note to. In response to the translation request, the script creation tool 604 may receive a translated portion corresponding to the portion of the note. The script creation tool 604 may present the translated portion to the user for editing or approval. The user may overwrite the portion with the translated portion.

While not specifically shown in FIG. 7, the user can use notes from a note templates library, which is described further with respect to the note templates tool 610 of FIG. 6A. Additionally, while not specifically shown in FIG. 7, the script creation tool 604 may include capabilities that enable the user to order (e.g., sequence) the notes according to a desired talk track.

Figure 8A:
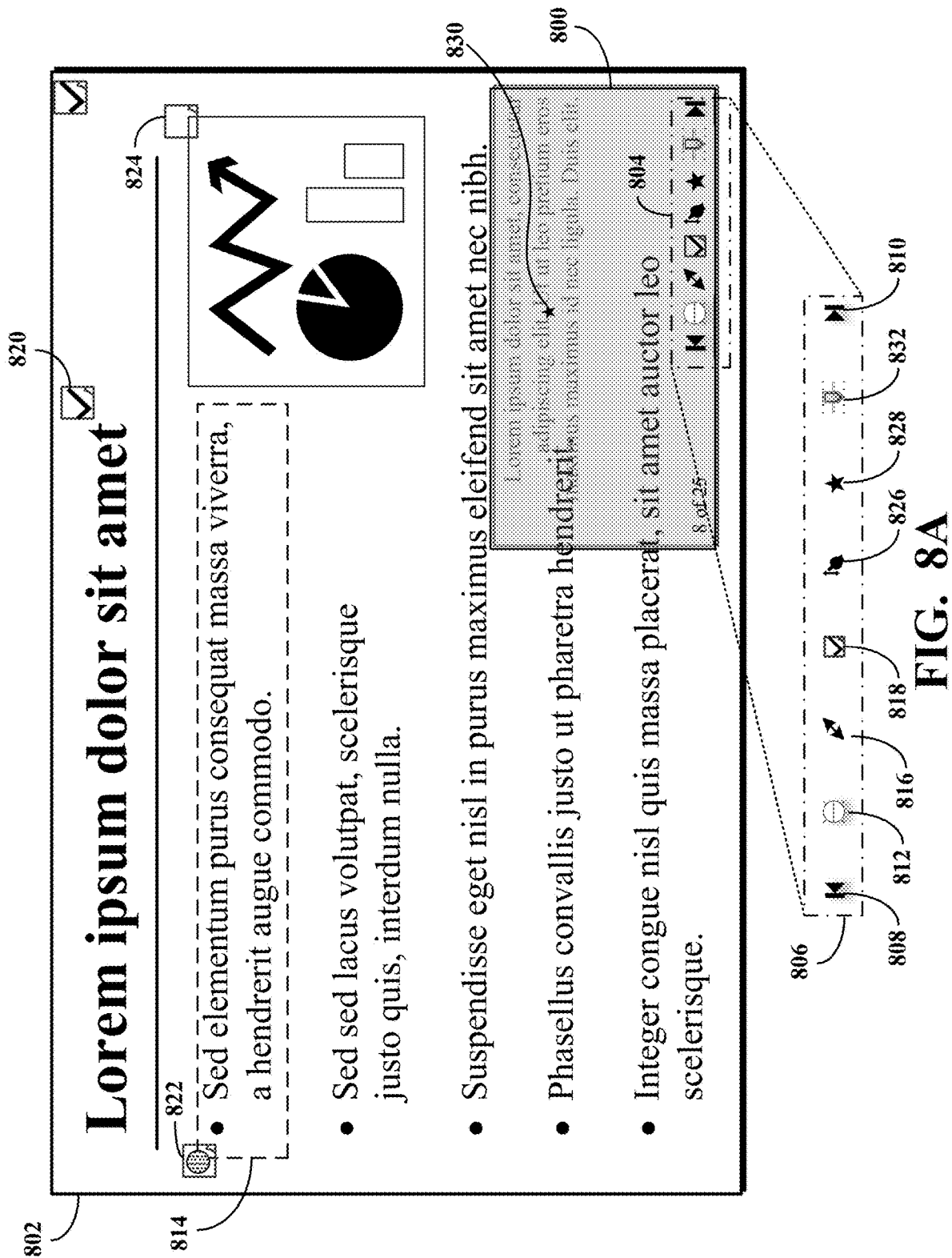
FIG. 8A is an example of a private user interface for using a conference script during a conference.

FIG. 8A is an example of a private user interface 800 for using a conference script during a conference. The private user interface 800 can be the private user interface 512 of FIG. 5 and can be generated by the script management software 510 and/or the script management software 506 of FIG. 5. The private user interface 800 can be shown during a conference as a transparent or a semi-transparent overlay over the content that is shared to the conference. As such, the user (i.e., presenter) can interact with the private user interface 800 while is still able to view the underlying content.

In FIG. 8A, the private user interface 800 is shown as being overlaid over the shared content (e.g., the slide 802), which is the slide 700 of FG. 7. The private user interface 800 includes a group of controls 804, which is shown in an expanded view 806 for clarity. The private user interface 800 can be displayed in a bottom right corner of the shared content. However, the private user interface 800 can include controls (not shown) that the user can use to move the private user interface 800 to other locations and/or to resize the private user interface 800.

A previous control 808, when invoked by the user, causes the script management software to display a previous notes in the private user interface 800. A next control 810, when invoked by the user, causes the script management software to display a next note in the private user interface 800. The next or previous notes to be displayed can be based on the order of notes set by the user when creating the script.

While presenting, the user may be interrupted by one of the conference participants to ask a question. The user may have to interrupt their flow to answer the question. The answer may take the user away from the script for some time (e.g., 5 or 10 minutes). After answering the question, the user may need to be reoriented to their location in the content. A highlight control 812, when invoked by the user, causes the portion of the content associated with the currently displayed note to be highlighted. Any highlighting can be used. In an example, a box (such as a box 814) may be drawn on a display of the user device around the content with which the displayed note is associated. The box 814 may flash for a few seconds (e.g., 2 seconds) and then disappear.

In another example, to answer the question, the user may have to change to another portion of the shared content (e.g., to another slide). When the highlight control 812 is invoked, the script management software 600 can cause the portion of the content (e.g., the slide 802) associated with the displayed note to be displayed and highlighted.

A docking control 816, when invoked by the user, causes the private user interface 800 to toggle from a floating (e.g., overlay) mode to a docked mode. In FIG. 8A, the private user interface 800 is shown in the overlay mode. When the docking control 816 is invoked, the private user interface 800 is changed to the docked mode, and vice versa. The docked mode is illustrated with respect to FIG. 8B.

Figure 8B:
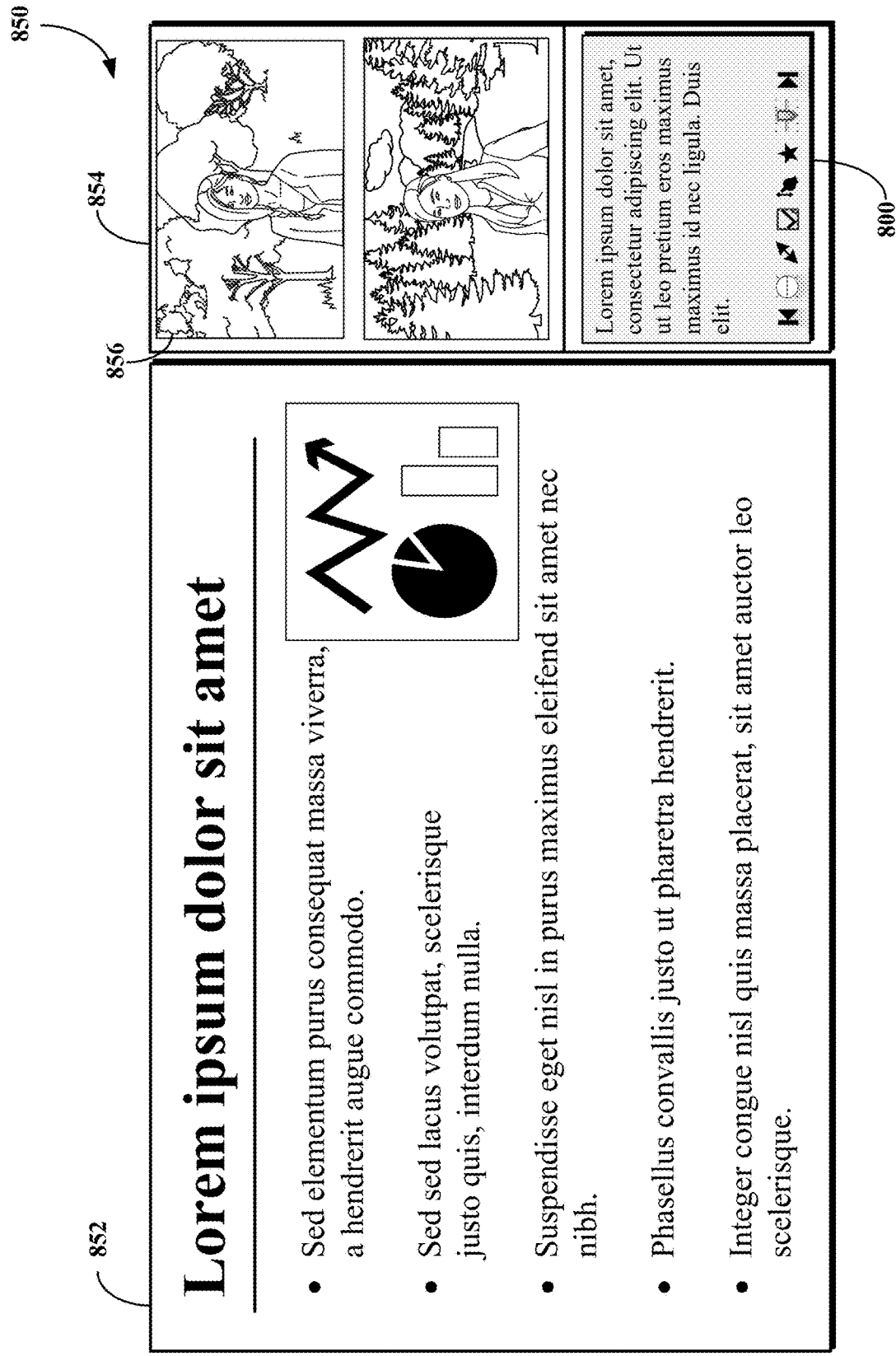
FIG. 8B illustrates a user interface associated with a conferencing software.

FIG. 8B illustrates a user interface 850 associated with a conferencing software. The user interface 850 includes a main stage 852 and a participant list 854. The user interface 850 illustrates that a conference includes at least two other conference participants, represented by respective tiles, such as a tile 856. The main stage includes the content that is shared, such as the slide 802 of FIG. 8A. FIG. 8B illustrates that, in the docked mode, the private user interface 800 can be included in a tile in the participant list 854.

Referring again to FIG. 8A, a show-progress control 818, when invoked by the user, causes adornments (e.g., icons) to be overlaid over the content indicating which of the notes the script management software has determined that the user has already covered, which object is currently being discussed by the user, and which other objects are associated with notes that have yet to be covered by the user. To illustrate, a note with a checkmark icon, such as the icon 820, may be used to indicate a note that has already been discussed (e.g., read) by the user; a note with a target icon, such as an icon 822, indicates that the note displayed in the private user interface 800 is associated with the indicated object of the content; and a note icon, such as an icon 824, indicates that this object of the content is associated with a note that has not been covered by the user.

An auto-scroll control 826 can be a toggle that, when invoked, causes the script playing tool to auto-scroll the note displayed in the private user interface 800. A note may overflow the private user interface 800. A speech-to-text tool or software, associated with the script management software may listen to the speech of the user as the user is reading notes. The speech-to-text tool may correlate the spoken words to the text of the displayed note. When it is detected, based on the speech-to-text, that the user is about to reach the end of the displayed text, the note can be scrolled down to display the next few lines of the notes. In an example, when the script playing tool 606 determines, based on the speech-to-text correlation, that the end of the current note has been reached, the script playing tool 606 can cause the next note to be displayed.

A bookmark control 828 can be used to return the user to a bookmarked location within the script. To illustrate, the user may have to stop reading their script and may have to navigate away from the current location of the script with the intent of returning to the same location to continue reading their script. For example, the user may have to switch to sharing different content that may be associated with another script or no script. For example, the user may have to navigate back in the content to another portion and show the notes associated therewith.

Regardless of the reasons, the user may mark a location in the script. To illustrate, and without limitations, the user may use a command that causes a marker 830 to be placed at a desired (e.g., bookmarked) location within the script. After returning to the content, the user may invoke the bookmark control 828 to cause the note that includes the marker 830 to be displayed in the private user interface 800. In an example, in response to invoking the bookmark control 828, the script playing tool 606 can additionally cause the portion of the content associated with the bookmark (e.g., the slide 802) to be shared in the conference (i.e., to be displayed at displays of the other conference participants).

A transparency control 832 is a slider that can be used by the user to control the transparency level of the private user interface 800. The script playing tool can configure a range of visibility options of the private user interface 800 via the transparency control 832. The visibility options can range from fully opaque to completely transparent, depending on a preference (e.g., setting) of the user as set via the transparency control 832. As such, the user can adjust the interface to suit their needs, whether they require full visibility of the underlying content or prefer a more pronounced view of the private user interface 800.

Figure 9:
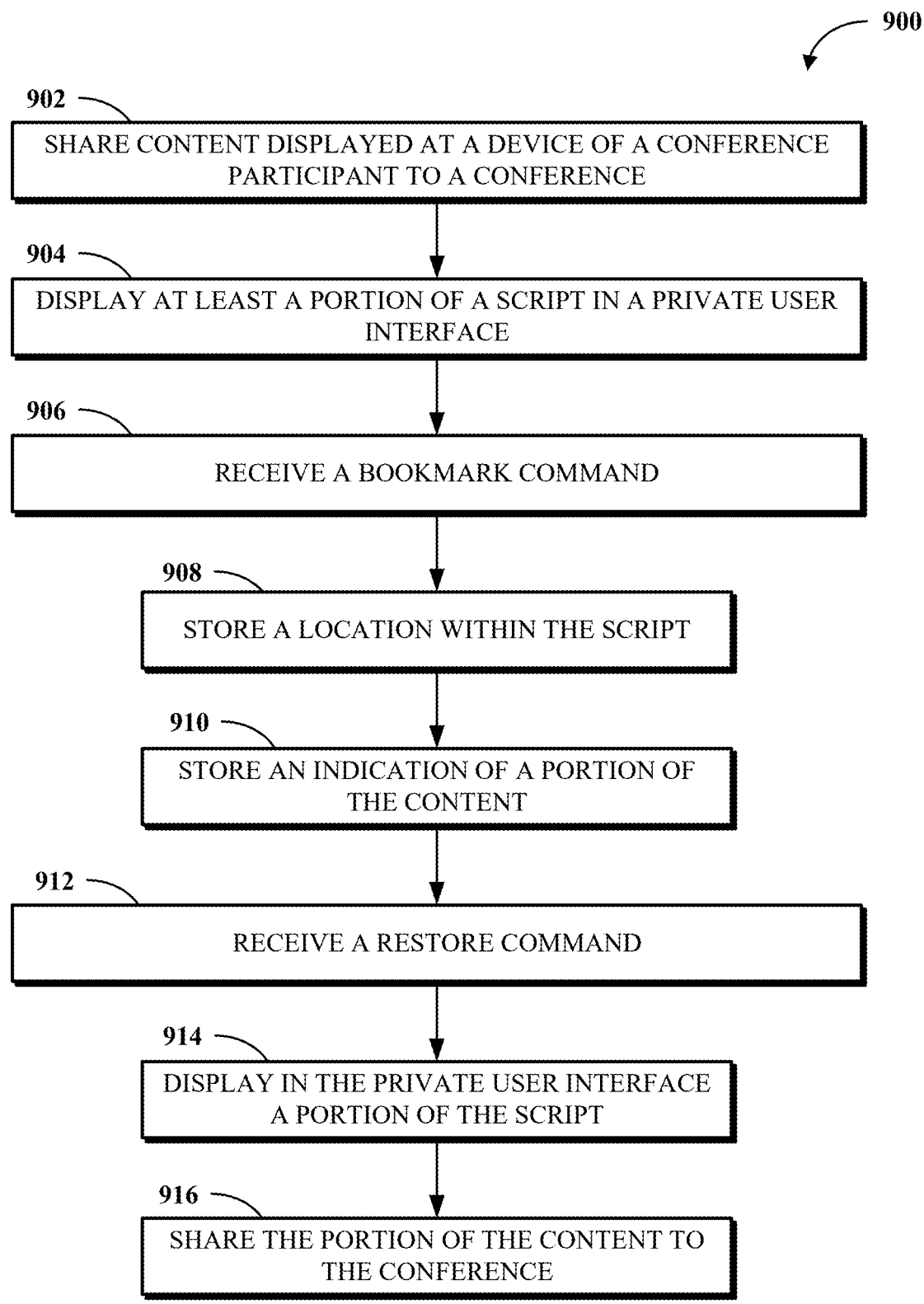
FIG. 9 is a flowchart of an example of a technique for displaying a script in a private user interface of a conference.

To further describe some implementations in greater detail, reference is next made to examples of techniques which may be performed by or using a system for creating and using a script in a conference. FIG. 9 is a flowchart of an example of a technique 900 for displaying a script in a private user interface of a conference. The technique 900 can be executed using computing devices, such as the systems, hardware, and software described with respect to FIGS. 1-8B. The technique 900 can be performed, for example, by executing one or more machine-readable programs or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

At 902, content displayed at a device of a conference participant is shared to a conference. The conference can be hosted by a conferencing system, such as the conferencing system 502 of FIG. 5. The device of the conference participant can be the client 504 of FIG. 5. In an example, the content can be a slide presentation.

At 904, at least a portion of a script associated with the conference can be displayed in a private user interface of the conferencing application. In an example, the script can include notes associated with objects of the content. The private user interface is exclusively displayed at the device of the conference participant and is not shown to (e.g., shared with) any other conference participant. The private user interface is associated with or displayed by a conferencing application that is in turn associated with the conferencing system.

At 906, a bookmark command is received. The bookmark (i.e., user) command can be as described with respect to the marker 830 of FIG. 8A. In response to the bookmark command, the technique 900 performs steps 908 and 910. At 908, a location within the script is stored based on the bookmark command; and, at 910, an indication of a portion of the content is stored. The portion of the content can be an object (e.g., an annotatable object) corresponding to a note of the script that includes the location. In a variant of the technique 900, only the location within the script is stored based on the bookmark command. That is, the technique 900 may not include the step 910.

At 912, a restore command is received. The restore command can be as described with respect to the bookmark control 828 of FIG. 8A. In response to the restore command, the technique 900 performs steps 914 and 916. At 914, a portion of the script that includes the stored location is displayed in the private user interface; and, at 914, the portion of the content is shared to the conference. In a variant of the technique 900, and in the case that only the location within the script is stored, the technique 900 does not share the portion of the content to the conference. That is, the technique 900 may not include the step 916.

In an example, speech-to-text processing can be used to determine that the conference participant read the portion of the script. The determination can be based on fuzzy matching. In response to the determination, a visual indicator can be added to the portion of the content that corresponds to the portion of the script, as described above.

The private user interface can be displayed with a transparent background. A transparency level of the private user interface can be set based on a received user setting. The user setting can be set using the transparency control 832 of FIG. 8A.

The private user interface can include user interface controls that, when invoked, cause the private user interface to display a next or a previous speaker note of the script. The user interface controls can be the next control 810 and the previous control 808 of FIG. 8A. The private user interface can include a toggle that, when toggled to a first state, causes the private user interface to display as a floating (overlay) window; and, when toggled to a second state, causes the private user interface to display as a docked window. The toggle can be the docking control 816 of FIG. 8A. In an example, the private user interface can be displayed in a tile of a participant list of the conference, such as shown in FIG. 8B. The private user interface can be overlaid over the shared content. In an example, a command is received to display the private user interface as a floating window.

The content can be a slide presentation (e.g., a presentation document) and the technique 900 can include identifying first objects of the presentation document covered by the conference participant. The first objects can be identified using speech-to-text. Visual indicators can be added to second objects of the presentation document not covered by the conference participant. By "covered" is meant that the conference participant has "spoken about." As described above with respect to the script facilitation tool 608, and in an example, words of the script to highlight can be identified based on speech-to-text processing.

In an example, the technique 900 can automatically scroll the script to a next portion of the script. The script can be automatically scrolled in response to the auto-scroll control 826. In an example, upcoming words of the script to be read by the conference participant can be highlighted. The number of words to be highlighted can be based on a determined (e.g., calculated) average reading speed of the conference participant. In an example, a next speaker note of the script can be displayed in response to determining that the conference participant read a current note.

Figure 10:
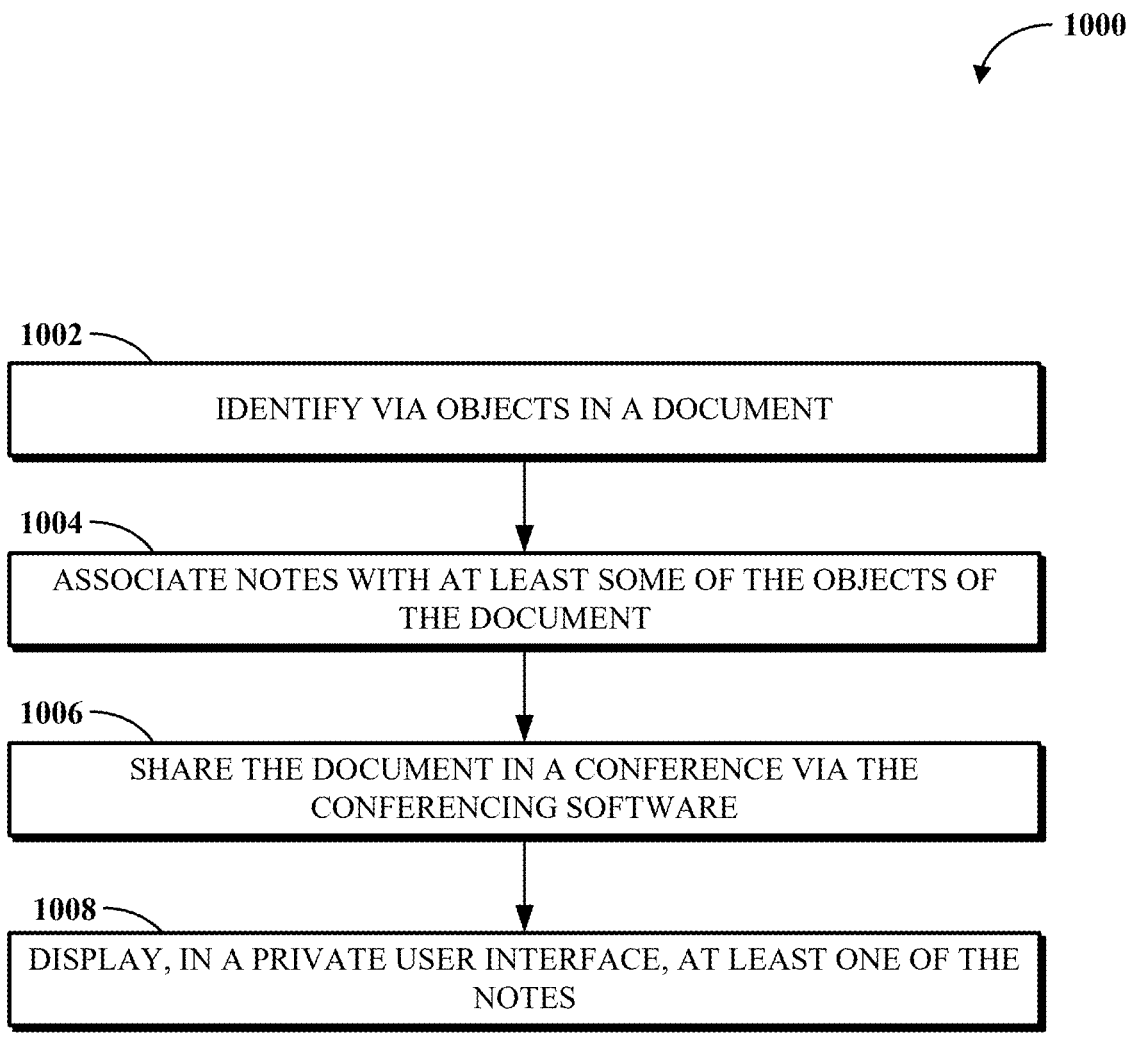
FIG. 10 is a flowchart of an example of a technique for creating a script for use in a conference.

FIG. 10 is a flowchart of an example of a technique 1000 for creating a script for use in a conference. The technique 1000 can be executed using computing devices, such as the systems, hardware, and software described with respect to FIGS. 1-8B. The technique 1000 can be performed, for example, by executing one or more machine-readable programs or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

At 1002, objects (i.e., annotatable objects) are identified in a document. The objects can be identified via a private user interface of a conferencing software. The objects can be identified as described with respect to the document parsing tool 602 of FIG. 6A.

At 1004, notes are associated with at least some of the objects of the document in response to requests to associate the notes to the at least some of the objects. The associations between notes and objects can be stored in a data store, such as the data store 508 of FIG. 5. A note can be associated with a visual object (e.g., a chart) of the document. A note can be associated with a title object of the document. A note can be associated with the document as a whole. In an example, the objects of the document having associated therewith notes can be visually identified, such as described with respect to FIG. 7.

The technique 1000 can include instructions for rendering a rich text editor in the private user interface. As such, the private user interface, in the creation mode, can include a rich text editor that is rendered by the instructions.

At 1006, the document is shared in a conference via the conferencing software. At 1008, at least one of the notes is displayed in the private user interface, based on a portion of the document currently displayed in the conference. While not specifically described above, the private user interface can operate in two modes: an creation mode and a presentation mode. In the creation mode, the user can associate notes with objects of a document. More generally, in the creation mode, a script can be authored/created for a presentation (e.g., a scheduled conference). The creation mode is illustrated with respect to FIG. 7. The presentation mode is illustrated with respect to FIGS. 8A-8B. In the presentation mode, the private user interface can be displayed with a transparent background. In the presentation mode, the private user interface can be displayed in an overlay mode or in a docked mode.

The technique 1000 can include, in the private user interface, a rewrite command that is associated with instructions that, when invoked, cause a rewrite request of a note to be transmitted to a natural language processor. That is, the technique 1000 can cause the rewrite comment to be rendered in a private user interface. As such, in an example, a block of text to associate with an object of the document can be received. A rewrite request can be transmitted to a natural language processor to obtain a rewritten text. The rewritten text is received in response to the rewrite request. The rewritten text can be associated as a note with the object.

The technique 1000 can include, in the private user interface, a translate command that is associated with instructions that, when invoked, cause a translation request of a note to be transmitted to a natural language processor. As such, in an example, a block of text in a first language is received for association with an object of the document. A translation request is transmitted to a natural language processor. The translation request can include an indicator of a second language. A translated text is received in response to the translation request. The translated text can be associated as a note with the object.

The technique 1000 can include, in the private user interface, a summarization command that is associated with instructions that, when invoked, cause a summarization request of the notes to be transmitted to a natural language processor. As such, in an example, a request for a summary of at least some of the notes can be transmitted, such as to a natural language processor. The received summary can be associated as a summary note with the document.

In an example, a note can be added to a library of notes. As such, the private user interface can include a user interface control that enables the user to add a note to a library of notes.

For simplicity of explanation, the techniques 900 and 1000 of FIGS. 9 and 10, respectively, are each depicted and described herein as a respective series of steps or operations. However, the steps or operations of the techniques 900 and 1000 in accordance with this disclosure can occur in various orders and/or concurrently. Additionally, other steps or operations not presented and described herein may be used.

Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method can include displaying at least a portion of a script associated with the conference in a private user interface of the conferencing application, where the private user interface is exclusively displayed at the device of the conference participant; receiving a bookmark command, in response to the bookmark command received by the conferencing application: storing a location within the script based on the bookmark command, and storing an indication of a portion of the content. The method can also include receiving a restore command; in response to the restore command: displaying in the private user interface a portion of the script that includes the location, and sharing the portion of the content to the conference. Other embodiments of this aspect include corresponding computer systems, apparatus, and computer programs recorded on one or more computer storage devices, each configured to perform the actions of the methods.

Implementations may include one or more of the following features. The method may include determining, using speech-to-text processing, that the conference participant read the portion of the script; and adding, at the device of the conference participant, a visual indicator to the portion of the content that corresponds to the portion of the script. The private user interface can be displayed with a transparent background. The private user interface can include user interface controls that, when invoked, cause the private user interface to display at least one of a next or a previous speaker note of the script. The private user interface can include a toggle that when toggled to a first state causes the private user interface to display as a floating window and when toggled to a second state causes the private user interface to display as a docked window. The content can be a presentation document, and the method may include: identifying, using speech-to-text processing, first objects of the presentation document covered by the conference participant; and adding visual indicators to second objects of the presentation document not covered by the conference participant. The method may include: identifying, based speech-to-text processing, words of the script to highlight; and highlighting the identified words. Implementations of the described techniques may include hardware, a method or process, or computer software on a computer-accessible medium.

One general aspect includes a system. The system also includes one or more memories; and one or more processors, the one or more processors configured to execute instructions stored in the one or more memories to: share, via a conferencing application, content displayed at a device of a conference participant to a conference; display at least a portion of a script associated with the conference in a private user interface of the conferencing application, where the private user interface is exclusively displayed at the device of the conference participant; receive a bookmark command; in response to the bookmark command received by the conferencing application: store a location within the script based on the bookmark command; and store an indication of a portion of the content; receive a restore command; in response to the restore command: display in the private user interface a portion of the script that includes the location; and share the portion of the content to the conference. Other embodiments of this aspect include corresponding computer systems, apparatus, and computer programs recorded on one or more computer storage devices, each configured to perform the actions of the methods.

Implementations may include one or more of the following features. The system where the one or more processors can be further configured to execute instructions stored in the one or more memories to: add respective visual indicators to objects of the content associated with notes of the script. The one or more processors can be configured to execute instructions stored in the one or more memories to: set a transparency level of the private user interface based on a received user setting. The one or more processors can be configured to execute instructions stored in the one or more memories to: automatically scroll to a next portion of the script. The one or more processors can be configured to execute instructions stored in the one or more memories to: display the private user interface in a tile of a participant list of the conference. The content can be a slide presentation and the one or more processors may be configured to execution instructions to: highlighting upcoming words of the script to be read by the conference participant. Implementations of the described techniques may include hardware, a method or process, or computer software on a computer-accessible medium.

One general aspect includes a non-transitory computer readable medium storing instructions operable to cause one or more processors to perform operations. The operations can include sharing, via a conferencing application, content displayed at a device of a conference participant to a conference; displaying at least a portion of a script associated with the conference in a private user interface of the conferencing application, where the private user interface is exclusively displayed at the device of the conference participant; receiving a bookmark command; in response to the bookmark command received by the conferencing application: storing a location within the script based on the bookmark command; and storing an indication of a portion of the content. The operations can include receiving a restore command; in response to the restore command: displaying in the private user interface a portion of the script that includes the location, and sharing the portion of the content to the conference. Other embodiments of this aspect include corresponding computer systems, apparatus, and computer programs recorded on one or more computer storage devices, each configured to perform the actions of the methods.

Implementations may include one or more of the following features. The non-transitory computer readable medium where the script may include notes associated with objects of the content. The private user interface can be overlaid over the shared content. The operations can include: displaying a next speaker note of the script in response to determining that the conference participant read a current note. The operations can include: receiving a command to display the private user interface as a floating window. The operations can include: adding visual indicators to objects of the content not covered by the conference participant. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   sharing, via a conferencing application, content displayed at a device of a conference participant to a conference;
   displaying at least a portion of a script associated with the conference in a private user interface of the conferencing application, wherein the private user interface is exclusively displayed at the device of the conference participant;
   receiving a bookmark command;
   in response to the bookmark command received by the conferencing application:
   storing a location within the script based on the bookmark command; and
   storing an indication of a portion of the content;
   receiving a restore command; and
   in response to the restore command:
   displaying in the private user interface a portion of the script that includes the location; and
   sharing the portion of the content to the conference.

2. The method of claim 1, further comprising:
   determining, using speech-to-text processing, that the conference participant read the portion of the script; and
   adding, at the device of the conference participant, a visual indicator to the portion of the content that corresponds to the portion of the script.

3. The method of claim 1, wherein the private user interface is displayed with a transparent background.

4. The method of claim 1, wherein the private user interface includes user interface controls that, when invoked, cause the private user interface to display at least one of a next or a previous speaker note of the script.

5. The method of claim 1, wherein the private user interface includes a toggle that when toggled to a first state causes the private user interface to display as a floating window and when toggled to a second state causes the private user interface to display as a docked window.

6. The method of claim 1, wherein the content is a presentation document, the method further comprising:
   identifying, using speech-to-text processing, first objects of the presentation document covered by the conference participant; and
   adding visual indicators to second objects of the presentation document not covered by the conference participant.

7. The method of claim 1, further comprising:
   identifying, based speech-to-text processing, words of the script to highlight; and
   highlighting the identified words.

8. A system, comprising:
   one or more memories; and
   one or more processors, the one or more processors configured to execute instructions stored in the one or more memories to:
   share, via a conferencing application, content displayed at a device of a conference participant to a conference;
   display at least a portion of a script associated with the conference in a private user interface of the conferencing application, wherein the private user interface is exclusively displayed at the device of the conference participant;
   receive a bookmark command;

in response to the bookmark command received by the conferencing application:
  store a location within the script based on the bookmark command; and
  store an indication of a portion of the content;
receive a restore command; and
in response to the restore command:
  display in the private user interface a portion of the script that includes the location; and
  share the portion of the content to the conference.

9. The system of claim 8, wherein the one or more processors are further configured to execute instructions stored in the one or more memories to:
add respective visual indicators to objects of the content associated with notes of the script.

10. The system of claim 8, wherein the one or more processors are further configured to execute instructions stored in the one or more memories to:
set a transparency level of the private user interface based on a received user setting.

11. The system of claim 8, wherein the one or more processors are further configured to execute instructions stored in the one or more memories to:
automatically scroll to a next portion of the script.

12. The system of claim 8, wherein the one or more processors are further configured to execute instructions stored in the one or more memories to:
display the private user interface in a tile of a participant list of the conference.

13. The system of claim 8, wherein the content is a slide presentation.

14. The system of claim 8, further comprising:
highlighting upcoming words of the script to be read by the conference participant.

15. A non-transitory computer readable medium storing instructions operable to cause one or more processors to perform operations comprising:
sharing, via a conferencing application, content displayed at a device of a conference participant to a conference;
displaying at least a portion of a script associated with the conference in a private user interface of the conferencing application, wherein the private user interface is exclusively displayed at the device of the conference participant;
receiving a bookmark command;
in response to the bookmark command received by the conferencing application:
  storing a location within the script based on the bookmark command; and
  storing an indication of a portion of the content;
receiving a restore command; and
in response to the restore command:
  displaying in the private user interface a portion of the script that includes the location; and
  sharing the portion of the content to the conference.

16. The non-transitory computer readable medium of claim 15, wherein the script comprises notes associated with objects of the content.

17. The non-transitory computer readable medium of claim 15, wherein the private user interface is overlaid over the shared content.

18. The non-transitory computer readable medium of claim 15, wherein the operations further comprise:
displaying a next speaker note of the script in response to determining that the conference participant read a current note.

19. The non-transitory computer readable medium of claim 15, wherein the operations further comprise:
receiving a command to display the private user interface as a floating window.

20. The non-transitory computer readable medium of claim 15, wherein the operations further comprise:
adding visual indicators to objects of the content not covered by the conference participant.

* * * * *